US008167761B2

(12) United States Patent
Di Micco

(10) Patent No.: US 8,167,761 B2
(45) Date of Patent: May 1, 2012

(54) DIFFERENTIAL ASSEMBLY PROVIDED WITH AN ADJUSTMENT DEVICE, IN PARTICULAR FOR MOTOR VEHICLES

(75) Inventor: Paolo Di Micco, Pomigliano D'arco (IT)

(73) Assignee: ELASIS—Società Consortile per Azioni, Pomigliano D'arco (IT)

(*) Notice: Subject to any disclaimer, the term of this patent is extended or adjusted under 35 U.S.C. 154(b) by 833 days.

(21) Appl. No.: 12/159,118

(22) PCT Filed: Dec. 23, 2006

(86) PCT No.: PCT/EP2006/070208

§ 371 (c)(1),
(2), (4) Date: Nov. 19, 2008

(87) PCT Pub. No.: WO2007/074151

PCT Pub. Date: Jul. 5, 2007

(65) Prior Publication Data

US 2009/0227414 A1 Sep. 10, 2009

(30) Foreign Application Priority Data

Dec. 27, 2005 (EP) .................................... 05425920

(51) Int. Cl.
*F16H 48/06* (2006.01)

(52) U.S. Cl. ...................................................... 475/230

(58) Field of Classification Search .................. 475/220, 475/230, 231, 235, 240
See application file for complete search history.

(56) References Cited

U.S. PATENT DOCUMENTS

| | | | | |
|---|---|---|---|---|
| 1,121,803 | A * | 12/1914 | Coakley | 475/246 |
| 1,438,313 | A * | 12/1922 | Kollman | 180/267 |
| 2,985,035 | A | 5/1961 | Toth | |
| 3,012,449 | A * | 12/1961 | Stockwell | 475/243 |
| 3,208,306 | A * | 9/1965 | Lewis | 475/235 |
| 3,580,108 | A * | 5/1971 | Mieras | 475/240 |
| 4,959,043 | A * | 9/1990 | Klotz et al. | 475/230 |
| 5,233,757 | A * | 8/1993 | Maguire | 29/893.1 |
| 5,480,360 | A * | 1/1996 | Patzer et al. | 475/230 |
| 5,584,777 | A * | 12/1996 | Sander et al. | 475/230 |
| 5,897,452 | A | 4/1999 | Charleston, III | |

(Continued)

FOREIGN PATENT DOCUMENTS

DE 19637120 C1 1/1998

(Continued)

OTHER PUBLICATIONS

PRC Office Action for Chinese application 200680049440.X, mailed on Aug. 25, 2010.

(Continued)

*Primary Examiner* — David D Le
*Assistant Examiner* — Michael Gonzalez
(74) *Attorney, Agent, or Firm* — FSP LLC

(57) ABSTRACT

A differential assembly, in particular for motor vehicles, transmits the motion from an input shaft to a pair of reciprocally counterposed coaxial output shafts and is provided with a ring gear rotably fed in use by the input shaft about a rotation shaft; the assembly being further provided with a gear set transmitting the motion from the ring gear to the output shafts and having a satellite gear carrier pin, whose axis is orthogonal to the axis of rotation of the ring gear; a single leaf spring is abuttingly coupled to two satellite gears to automatically adjust the position of the satellite gears themselves.

18 Claims, 4 Drawing Sheets

37 43 36 53 60 50 51 34 33 38 57 58 52 38 39 57 58 51 54 56 43

U.S. PATENT DOCUMENTS

| | | | | |
|---|---|---|---|---|
| 6,997,842 | B2 * | 2/2006 | Atkinson et al. | 475/235 |
| 7,207,110 | B2 * | 4/2007 | Pascoe et al. | 29/893.2 |
| 7,217,217 | B2 * | 5/2007 | Santelli | 475/230 |
| 7,845,661 | B2 * | 12/2010 | Kondou et al. | 280/124.108 |

FOREIGN PATENT DOCUMENTS

| | | | |
|---|---|---|---|
| FR | 2754035 | A | 4/1998 |
| JP | 62098048 | A | 5/1987 |
| JP | 08049758 | A | 2/1996 |
| SU | 1078156 | A1 | 3/1984 |

OTHER PUBLICATIONS

International Search Report for application PCT/EP2006/070208, mailed on Apr. 27, 2007.

* cited by examiner 2
3
4
5
8,13
30
32
20
19
33
14
11
25
12
23
24
22
21
1

1
12
13
14
15
17
18
18a
34
36
37
41
42
43
50
51
52
53
54
55
56
57
58
60

DIFFERENTIAL ASSEMBLY PROVIDED WITH AN ADJUSTMENT DEVICE, IN PARTICULAR FOR MOTOR VEHICLES

CROSS REFERENCE TO RELATED APPLICATIONS

This application claims priority under 35 USC 371 as a National Phase in the UNITED STATES of International Application No. PCT/EP2006/070208, filed on Dec. 23, 2006.

TECHNICAL FIELD

The present invention relates to a differential assembly provided with an adjustment device, in particular for motor vehicles.

BACKGROUND ART

As known, in motor vehicles the differential assembly transmits motion from a propeller shaft to a pair of reciprocally counterposed, coaxial drive axles which rotably feed the drive wheels.

Specifically, the differential assembly is arranged in an oil bath inside a fixed casing and comprises a supporting box, usually of cast iron, having two reciprocally opposite openings crossed by the ends of the two drive axles and carrying an outer ring gear in a relative fixed position.

The ring gear has a toothing meshing with the pinion integral with the propeller shaft, thus defining a speed reduction ratio, for rotably feeding the supporting box about the axis defined by the two drive axles.

The supporting box accommodates a planetary gear set comprising a pair of satellite gears, a pair of planetary gears meshing with the satellite gears and a satellite gear carrier pin, whose ends are coupled to respective anchoring portions of the supporting box.

The satellite gear carrier pin extends in the direction orthogonal to the drive axles, turns along with the supporting box, while each of the planetary gears is mounted, in a fixed angular position, onto the end of a respective drive axle to rotationally feed it.

The position of the satellite gears and/or the planetary gears is normally adjusted during assembly by appropriately mounted spacer members, whose thickness may be selected to compensate for possible clearance due to machining or coupling tolerance with respect to the supporting box and/or the other gears.

The differentials of the known type described above are poorly satisfactory, because they have a relatively high number of components and require relatively long times for choosing and mounting the aforesaid spacer members.

Furthermore, the solutions described above are not capable of adjusting the position of the gears automatically to compensate for possible clearance due to wear occurring during operation, and of constantly maintaining the satellite gears and the planetary gears correctly reciprocally meshed.

DISCLOSURE OF INVENTION

It is the object of the present invention to achieve a differential assembly provided with an adjustment device, in particular for motor vehicles, which allows to simply and cost-effectively compensate for the problems explained above and, preferably, allows to facilitate the assembly of the differential assembly itself.

According to the present invention, a differential assembly, in particular for motor vehicles, adapted to transmit the motion from an input shaft to a pair of reciprocally counterpoised, coaxial output shafts is obtained; the assembly comprising:

- a ring gear adapted to be rotably fed by said input shaft about its axis;
- a gear set to transmit the motion from said ring gear to said output shafts; the gear set comprising two reciprocally coaxial satellite gears, turning along with said ring gear about said rotation axis, and turning with respect to said ring gear about a further axis orthogonal to said rotation axis;
- adjustment means of the position of said satellite gears for compensating clearance;

characterised in that said adjustment means comprise a single spring coupled to both said satellite gears.

Preferably, said spring is a leaf spring having a C-shaped about the rotation axis of said ring gear, for example a circular shape, open along a segment of its circumference.

Conveniently, said spring comprises two diametrically and reciprocally opposite end portions on which said satellite gears are abuttingly arranged and has a concave surface complementary to a base surface of said satellite gears, for abutting said satellite gears.

Specifically, said end portions have respective reciprocally openings which are coaxial along said further axis of said satellite gears and are engaged by the ends of a satellite gear carrier pin.

Preferably, said spring carries at least two reference teeth reciprocally defining a seat in a direction parallel to said axis of rotation, in particular for engaging an inner portion of said ring gear.

BRIEF DESCRIPTION OF THE DRAWINGS

For a better understanding of the present invention, it will now be described a preferred embodiment only by way of non-limitative example, and with reference to the accompanying drawings, in which.

BEST MODE FOR CARRYING OUT THE INVENTION

Figure 1:
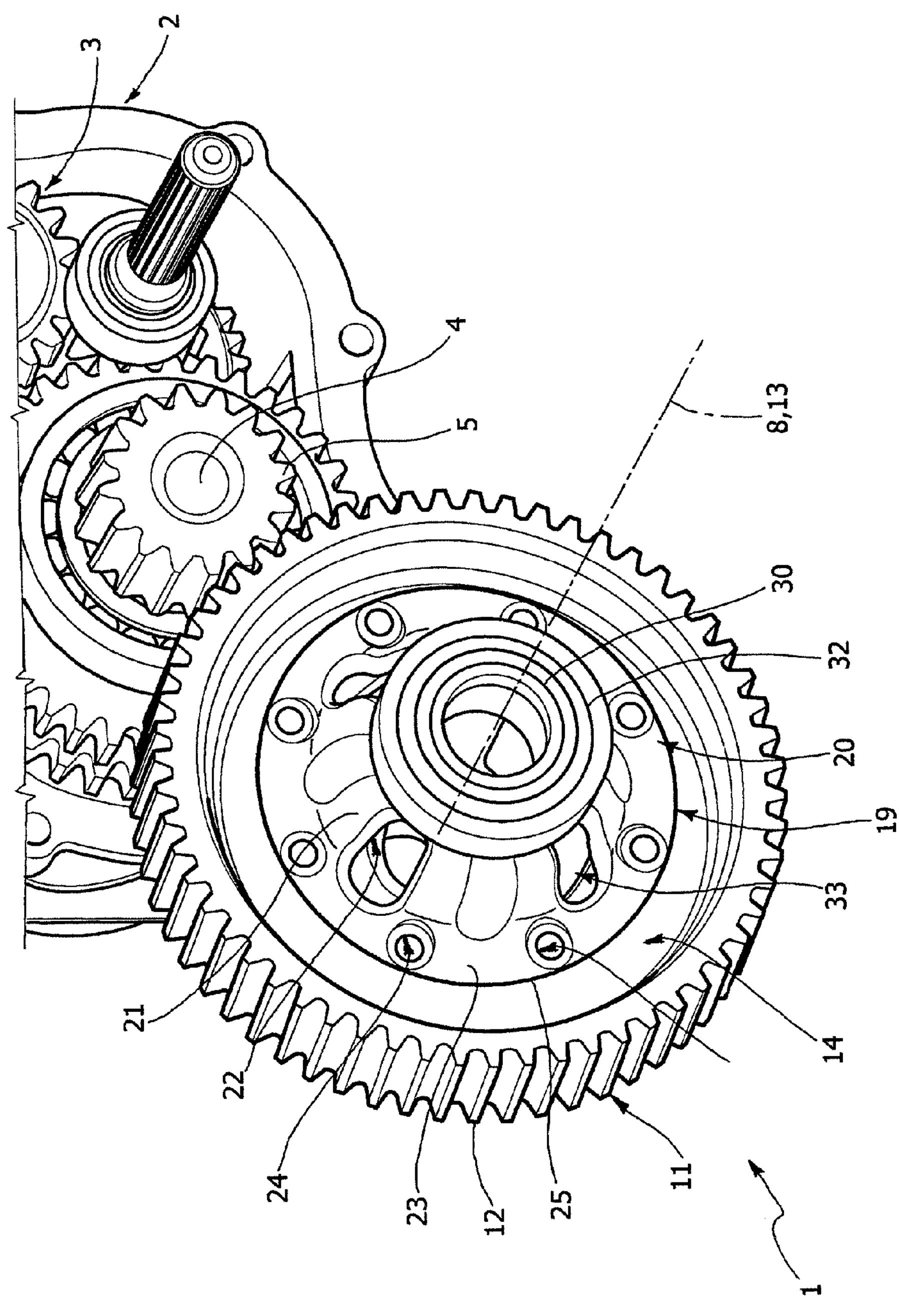
FIG. 1 shows in perspective a preferred embodiment of a differential assembly provided with an adjustment device, in particular for motor vehicles, according to the present invention.

In FIG. 1, it is indicated by 1 a differential assembly constituting part of a transmission assembly 2 of a motor vehicle (partially shown). Specifically, the transmission assembly 2 comprises a gearbox 3, whose output shaft 4 carries a pinion 5 splined at its end.

The assembly 1 transmit the motion from the pinion 5 to a pair of counterpoised drive axles 7 (schematically shown by a broken line in FIG. 3), which extend coaxially together along an axis 8.

The assembly 1 is accommodated in a supporting casing (not shown) and comprises a ring gear 11 which is made of steel and has, on its outer periphery, a toothing 12 meshing with the pinion 5 and defined, in the particular example described, by a cylindrical straight toothing.

The ring gear 11 is turnable about its axis 13 coinciding with axis 8, as will be better explained in detail below, and has respective circular axial centring ridges 15 on its side faces 14.

Figure 2:
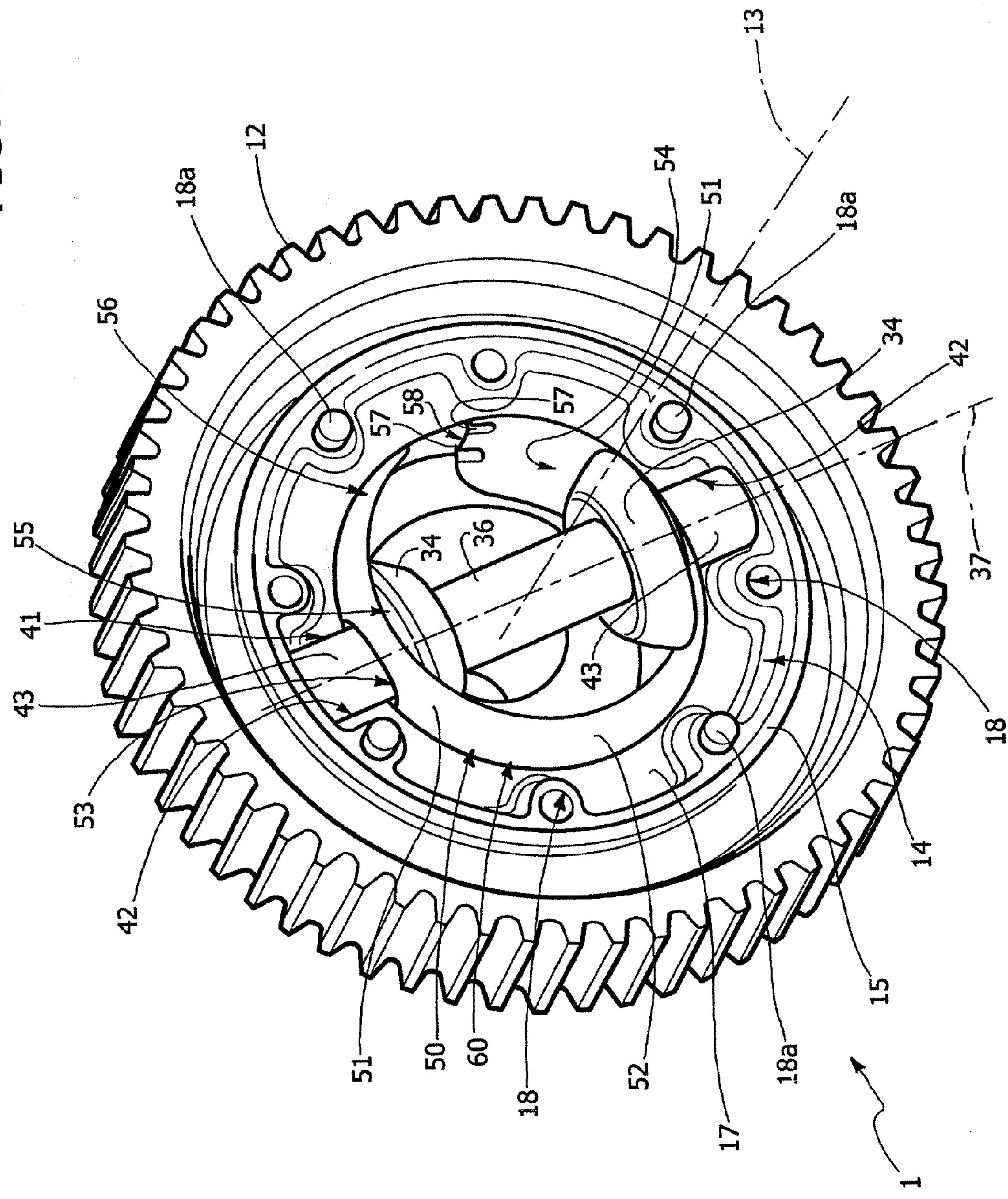
FIG. 2 shows, in perspective, a detail of the differential assembly in FIG. 1.

With reference to FIG. 2, the ridges 15 radially delimit an inner annular portion 17, having a plurality of holes 18 parallel to the axis 13 and angularly reciprocally distanced for fastening a protection box 19, preferably made of aluminium.

Some of the holes 18 may eventually be engaged by a protruding reference dowel 18*a* for angularly positioning the box 19.

The box 19 comprises two half shells 20, each fastened to the holes 18 of a respective face 14 by means of screws or other fastening members (not shown).

Each half shell 20 comprises a housing 21, having a plurality of openings 22 for the passage of oil and radially outwardly ending with an annular flange 23 abuttingly arranged against the portion 17.

The flange 23 has, in turn, a plurality of holes 24 aligned with the holes 18 for fastening said fastening members, and an outer circular edge 25 surrounded by the ridge 15.

Figure 3:
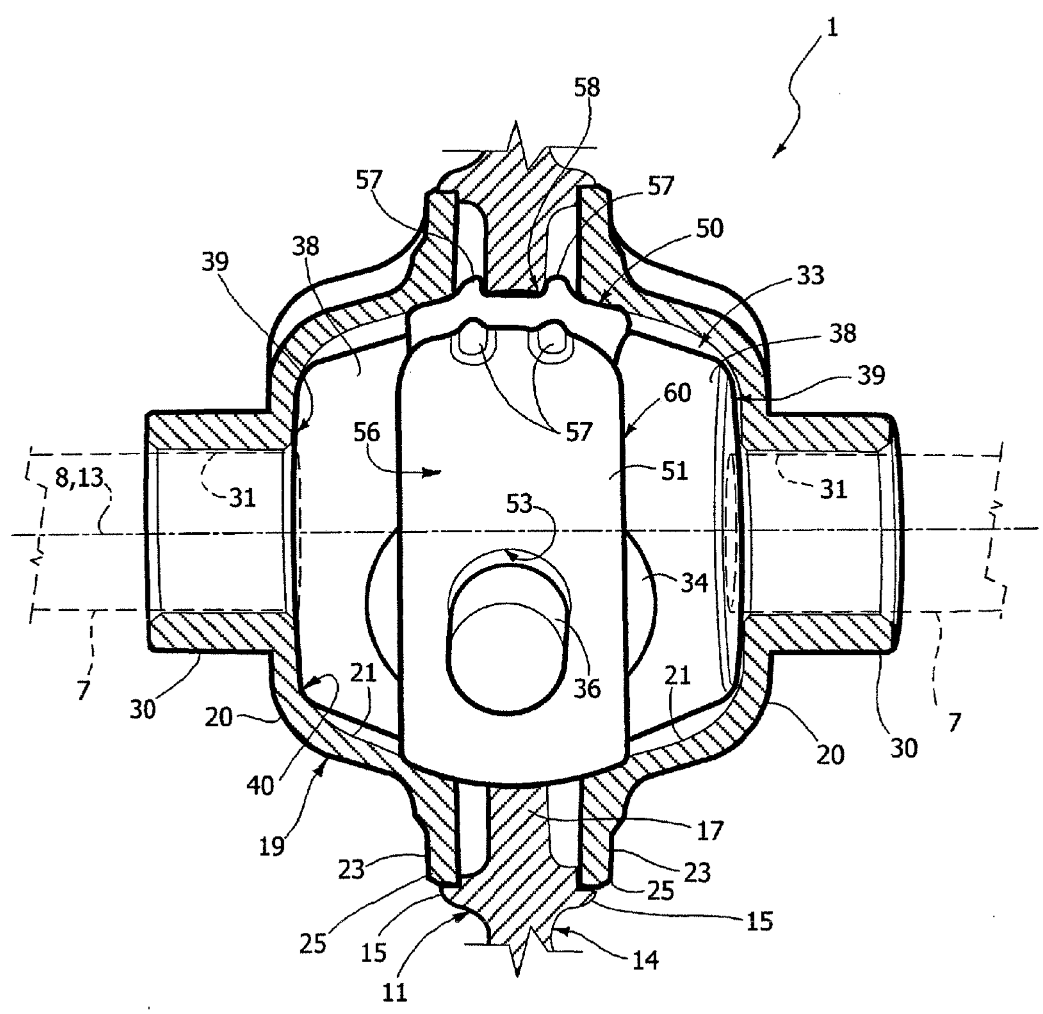
FIG. 3 shows, with parts sectioned and with parts removed for clarity, the differential assembly in FIG. 1.
Figure 4:
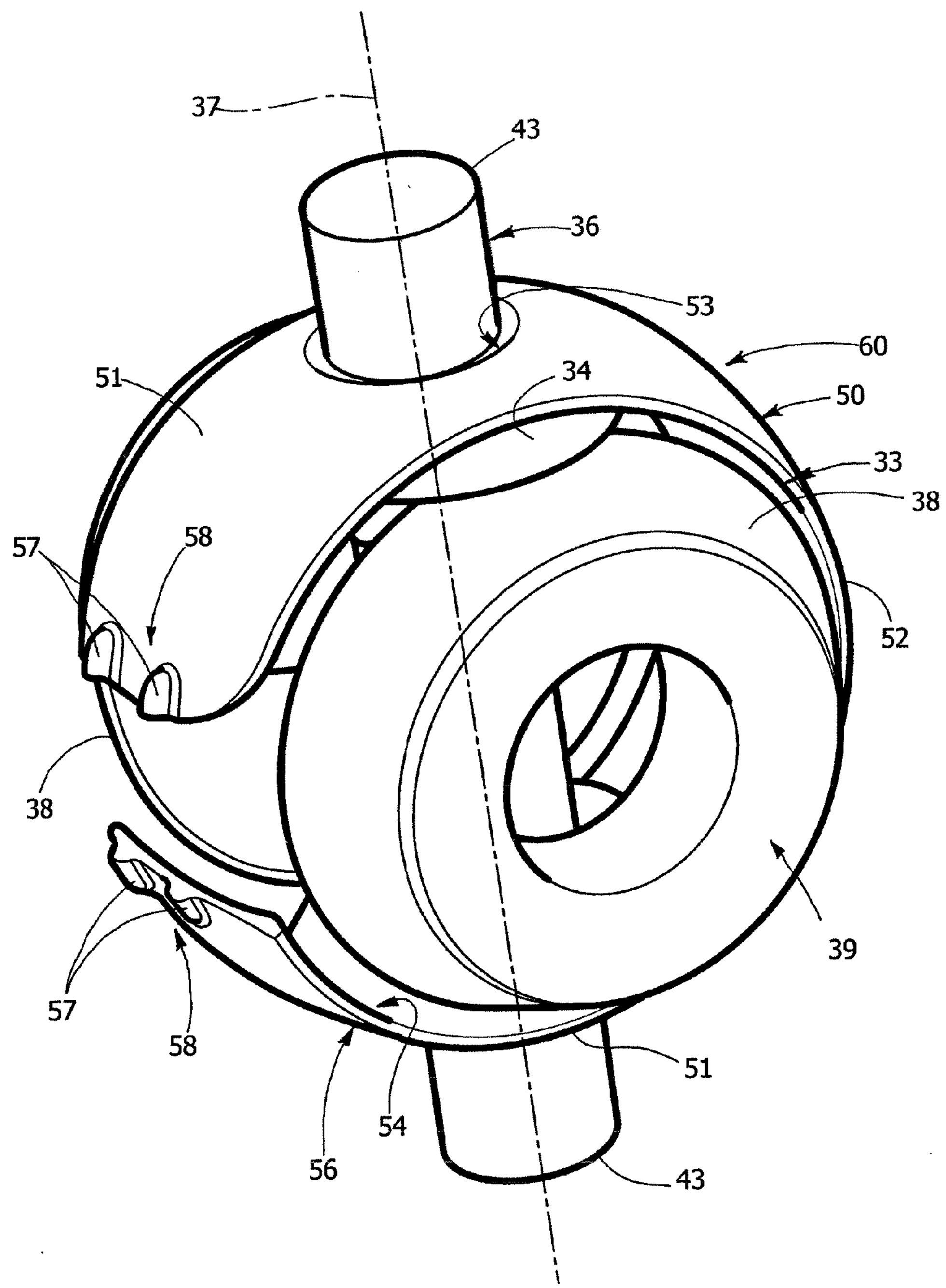
FIG. 4 shows in a different perspective a magnified view of a detail in FIG. 3.

Each half shell 20 further comprises a respective cylindrical shank 30, extending from the respective housing 21 along the axis 13 in a direction opposite to the ring gear 11 and is axially hollow to allow the passage with clearance of the end 31 of a respective drive axle 7 (FIG. 3).

The outer cylindrical surfaces of the shanks 30 carry respective bearings 32, which maintain the assembly 1 coupled to said supporting casing and allow the ring gear 11 and the box 19 to turn about the axis 13.

With reference to FIGS. 2 and 3, the box 19 accommodates a planetary gear set 33 comprising a pair of satellite gears 34, whose toothing is not shown in FIG. 2. The satellite gears 34 are carried by a pin 36, whose axis 37 is orthogonal to axis 13.

The satellite gears 34 are coaxial to each other and to the pin 36 itself so as to turn with respect to the ring gear 11 about axis 37.

With reference to FIG. 3, the gear set 33 further comprises a pair of planetary gears 38, which are reciprocally coaxial along axis 8, are interposed between the satellite gears 34, mesh with the satellite gears 34 themselves, and are each splined in fixed angular position onto a respective end 31.

Specifically, the planetary gears 38 comprise respective bases 39, which rotationally engage, about axis 8, respective centring and guiding seats 40 made in the half shell 20.

The ring gear 11 comprises a coupling device 41 for the pin 36, so as to transmit the motive torque to the pin 36 itself without the motive torque being transferred to the box 19.

The device 41 comprises two seats 42 made along the axis 37 in the portion 17 in reciprocally diametrically opposite positions with respect to the axis 13 and each engaged by a respective end 43 of the pin 36.

Specifically, the pin 36 may be rotationally coupled to the portion 17 about axis 37, for example by radial clearance or by interposing sleeve or ball bearings (not shown); alternatively, it may be fixedly coupled thus leaving only the satellite gears 34 free to rotate about the axis 37.

In the particular example described above, the seats 42 cross portion 17 in a direction parallel to axis 13 and are delimited and closed, along such direction, by the flanges 23. Therefore, fins 23 act as shoulder for withholding the ends 43 of the pin 37 in engagement with the seats 42 in direction parallel to the axis 13 (FIG. 3).

In the particular example described, the pin 36 is coupled to the ring gear 11 so as to have a clearance, for example equal to a tenth of a millimeter, in a direction parallel to the axis 13: in such way, the position of the pin 36 may settle or adjust itself automatically with respect to the ring gear 11 in use and compensate for possible machining inaccuracies in couplings and/or alignments.

According to the invention, the position of the satellite gears 24 is adjusted, in use, automatically by a single elastic leaf member 50 having a C-shape in front view along the axis 13.

The elastic member 50 is essentially coaxial to the ring gear 11 and comprises two end portions 51 interposed between the satellite gears 34 and the portion 17 of the ring gear 11.

The portions 51 are joined together by an intermediate portion 52 and are provided with respective slots 53 crossed by the pin 36, with clearance in the circumferential direction with respect to the axis 13, have an inner surface 54 abuttingly arranged against the base surfaces 55 of the satellite gears 34. Specifically, the elastic member 50 has a C-shaped cross section: in other words, the inner surface 54 is concave towards the axis 13, so that the surfaces 54 and 55 are essentially and reciprocally complementary.

The elastic element 50 has an outer surface 56, which is outwardly convex and faces portion 17 in a radial direction with respect to axis 13. Two pairs of teeth 57 protrude in a direction opposite to the axis 13 from surface 56. The teeth 57 are arranged at the ends of the elastic member 50, considering the circumferential direction with respect to axis 13, and therefore the C-shaped section of the elastic member 50 is constant along such circumferential direction up to its ends.

The teeth 57 define therebetween, in a direction parallel to axis 13, a seat 58 which is engaged by the portion 17. Specifically, the coupling between the teeth 57 and the edges of the portion 17 allows to position and withhold the elastic member 50 during the assembly of the assembly 1, along with the pin 36 and the satellite gears 34, in a fixed axial position.

Specifically, the pin 36, the satellite gears 34 and the elastic member 50 define a set 60 which can be pre-assembled before being coupled to the ring gear 11 during assembly.

To assemble the assembly 60 it is sufficient to abuttingly arrange the bases of the satellite gears 34 on the inner surface 54, aligning the holes of the satellites 34 (not shown in the attached figures) with the respective slots 53, and then inserting the pin 36 along the axis 37 through the slots 53 and such holes.

After being pre-assembled, the assembly 60 is coupled to the portion 17 of the ring gear 11, by inserting the ends 43 of the pin 36 into the seats 42 in a direction parallel to axis 13 and by inserting portion 17 in the seat 58 defined by the elastic member 50, making the two teeth 57 snap on opposite sides of the portion 17 itself. In this condition, the assembly 60 remains temporality stationary with respect to the ring gear 11.

Then, the planetary gears 38 are coupled to the satellite gears 34 and the half shells 20 are fastened to the faces 14 of the ring gear 11, so as to enclose the gear set 33 and stably maintain the pin 36 engaged in the seats 42 and the planetary gears 38 meshed to the satellite gears 34.

In use, the elastic member 50 exerts an elastic thrust pressure on both satellite gears 34 radially towards axis 13 and then towards the planetary gears 38, both to compensate for the clearance due to machining and coupling tolerance of the various components of the gear set and to compensate for clearance due to wear arising inside the box 19 during operation.

The meshing of the planetary gears 38 and the satellite gears 34 is therefore optimal, shock-free, with consequent silentness of the system, also in time.

It is evident that the adjustment is automatic, being caused by the bias of an inner elastic member, and not by rigid spacers, does not require interventions from the outside after assembly, and is extremely simple because it envisages the use of a single component for both satellite gears 34.

Advantageously, the automatic adjustment is then performed, not only by the elastic member 50, but also by the clearance between the pin 36 and the seats 43, to allow the pin 36 to arrange itself automatically with respect to the ring gear 11.

The features of the elastic member 50 also make assembly extremely simple because they allow to form the assembly 60 from the ring gear 11. Specifically, the teeth 57 facilitate the coupling of the ring gear 11 and maintain the assembly 60 stationary before fastening the flanges 23.

Then, the assembly of the assembly 1 is also simple because a portion of the box 19, i.e. the flanges 23, stably maintains the pin 36 in a fixed position, without the need for additional components.

It is finally apparent that changes and variations can be made to the assembly 1 here described and illustrated without however departing from the scope of protection of the present invention, as defined in the accompanying claims.

Specifically, different materials may be used for the various components with respect to those shown by way of example and/or the device 41 may be different from that described with reference to the attached drawings.

Furthermore, the half shells of the box 19 may be fixed to the ring gear in a different way with respect to coupling by screws, for example by welding, and/or the elastic member 50 may be coupled to a cast iron supporting box of the traditional type, instead of being directly coupled to the ring gear 11 as in the solution shown.

The invention claimed is:

1. A differential assembly for motor vehicles, adapted to transmit motion from an input shaft to a pair of coaxial output shafts; the assembly comprising:
- a ring gear adapted to be rotably fed by said input shaft about a rotation axis of the ring gear;
- a gear set to transmit the motion from said ring gear to said output shafts; the gear set comprising two reciprocally coaxial satellite gears, turnable along with said ring gear about said rotation axis, and rotatable with respect to said ring gear about a second axis orthogonal to said rotation axis;
- adjustment means of the position of said satellite gears;
- said adjustment means comprising a single spring coupled to both said satellite gears and exerting an elastic thrust pressure on both said satellite gears radially towards the rotation axis of said ring gear;
- wherein said spring is a leaf spring being C-shaped about the rotation axis of said ring gear.

2. A differential assembly according to claim 1, wherein said spring has a circular shape, open along a segment of its own circumference.

3. A differential assembly according to claim 2, wherein said spring comprises two end portions that are diametrically opposite, on which said satellite gears are abuttingly arranged.

4. A differential assembly according to claim 3 wherein said end portions have respective openings, which are along said second axis of said satellite gears and are engaged by the ends of a satellite gear carrier pin.

5. A differential assembly according to claim 4, wherein said openings are defined by slots elongated in circumferential direction with respect to the axis of rotation of said ring gear.

6. A differential assembly according to claim 1 wherein said spring has a concave surface complementary to a base surface of said satellite gears for abutting said satellite gears.

7. A differential assembly according to claim 1, said spring carries at least two reference teeth defining therebetween a seat in a direction parallel to said rotation axis.

8. A differential assembly according to claim 7, wherein said seat is engaged by an inner portion of said ring gear.

9. A differential assembly according to claim 7 or 8, wherein said teeth protrude from an outer surface of said spring.

10. A differential assembly according to claim 1, wherein said gear set comprises a satellite gear carrier pin coupled with clearance to said ring gear.

11. A differential assembly according to claim 10, wherein said clearance is made in a parallel direction to the axis of rotation of said ring gear.

12. A differential assembly for motor vehicles, adapted to transmit motion from an input shaft to a pair of coaxial output shafts; the assembly comprising:
- a ring gear adapted to be rotably fed by said input shaft about a ring gear rotation axis;
- a gear set to transmit the motion from said ring gear to said output shafts; the gear set comprising two coaxial satellite gears, turnable along with said ring gear about said rotation axis, and rotatable with respect to said ring gear about a second axis orthogonal to said rotation axis;
- adjustment means of the position of said satellite gears;
- said adjustment means comprising a single spring coupled to both said satellite gears and exerting an elastic thrust pressure on both said satellite gears radially towards the rotation axis of said ring gear;
- said spring carries at least two reference teeth defining therebetween a seat in a direction parallel to said axis of rotation; and
- said seat is engaged by an inner portion of said ring gear.

13. The differential assembly of claim 12, wherein said spring is a leaf spring being C-shaped about the rotation axis of said ring gear.

14. A differential assembly according to claim 12, wherein said spring has a circular shape, open along a segment of its own circumference.

15. A differential assembly according to claim 14, wherein said spring comprises two diametrically opposite end portions, on which said satellite gears are abuttingly arranged.

16. A differential assembly according to claim 15, wherein said end portions have respective openings, which are along said second axis of said satellite gears and are engaged by the ends of a satellite gear carrier pin.

17. A differential assembly according to claim 16, wherein said openings are defined by slots elongated in circumferential direction with respect to the axis of rotation of said ring gear.

18. A differential assembly according to claim 12, wherein said spring has a concave surface complementary to a base surface of said satellite gears for abutting said satellite gears.

* * * * *